United States Patent [19]
Schaffer

[11] Patent Number: 6,041,363
[45] Date of Patent: *Mar. 21, 2000

[54] IMBEDDING VIRTUAL DEVICE DRIVER (VXD) CALLS IN A DYNAMIC LINK LIBRARY (DLL)

[75] Inventor: Daniel H. Schaffer, Colorado Springs, Colo.

[73] Assignee: Sun Microsystems, Inc,, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/622,886

[22] Filed: Mar. 29, 1996

[51] Int. Cl.[7] ............................ G06F 15/163; G06F 9/00; G06F 9/46
[52] U.S. Cl. ............................................. 709/301; 709/305
[58] Field of Search ....................... 395/681, 600, 395/200.09, 680, 200, 828, 183.14; 364/579; 709/301, 305

[56] References Cited

U.S. PATENT DOCUMENTS

| | | | |
|---|---|---|---|
| 5,233,611 | 8/1993 | Triantafyllos et al. | 371/16.1 |
| 5,548,759 | 8/1996 | Lipe | 395/600 |
| 5,557,740 | 9/1996 | Johnson et al. | 395/183.14 |
| 5,638,517 | 6/1997 | Bartek et al. | 395/200.18 |
| 5,691,926 | 11/1997 | Cannon et al. | 364/579 |
| 5,692,128 | 11/1997 | Bolles et al. | 395/200.09 |
| 5,696,970 | 12/1997 | Sandage et al. | 395/681 |
| 5,748,980 | 5/1998 | Lipe et al. | 395/828 |

FOREIGN PATENT DOCUMENTS

| | | | |
|---|---|---|---|
| 0 588046A1 | 12/1994 | European Pat. Off. | G06F 13/38 |

OTHER PUBLICATIONS

Asche, Ruediger; "What's New in Windows 95 for VxD Writers", MSDN, pp. 1–13 Apr. 29, 1994.
Asche, Ruediger, "Little Device Driver Writer", pp. 1–26, Feb. 25, 1994.
IBM Technical Disclosure Bulletin, OS/2 Virtual Device Driver Support for CD–ROM, vol. 37, No. 10, Oct. 1994.
Larvoire, Jean–Francois; A VxD to Monitor Hardware Interrupts, Windows Developer's Journal, pp. 1–15, Mar. 1996.
Don Matthews, Porting VxDs from Windows 3.1 to Windows 95, Dr. Dobb's Journal on CD–ROM, Nov. 1995.
Ruediger Asche, "What's New in Windows 95 for VxD Writers?", Dr. Dobb's Journal on CD–ROM, Apr. 1994.
Laurence Kepple, The Black Arat of GUI Testing, Dr. Dobb's journal on Cd–ROM, Feb. 1994.
Russinovich et al, "Examining the Windows 95 layered file system", Dr. Dobb's Journal v20,n12 p60(9), Dec. 1995.
Johnson et al, "Dynamic Link Libraries Under Microsoft Windows", Dr. Dobb's Journal on Cd–Rom, Mar. 1989.
Craig Lindley, "Very dynamic Linking in Windows", Dr. Dobb's Journal on CD–ROM, Sep. 1994.

*Primary Examiner*—Lucien U. Toplu
*Assistant Examiner*—Pat Caldwell
*Attorney, Agent, or Firm*—Holland & Hart

[57] ABSTRACT

An interface in a dynamic link library is created which communicates with and provides data translation functions from an application program, such as a test tool, to a device driver. A virtual device driver in an operating system of a computing system is accessed by a calling program to perform and verify the operation of the virtual device driver. A request from the calling program to perform an operation supported by the virtual device driver is decoded in the interface of the dynamic link library. An address of the virtual device driver corresponding to the requested operation is acquired in the dynamic link library.

A processing module maintained in the dynamic link library for processing the requested operation is invoked, and data from this module is passed to the virtual device driver in response to the requested operation. In addition, data parameters are configured by the processing module of the dynamic link library for passing the requested data from the calling program to the virtual device driver. A return value is received from the virtual device driver indicating the success or failure of the requested operation. The return value is passed from the module of the dynamic link library to the calling program. Also, the processing module of the dynamic link library receives data returned from the virtual device driver in response to the requested operation, processes the data, and passes the processed data to the calling program.

11 Claims, 10 Drawing Sheets

IMBEDDING VIRTUAL DEVICE DRIVER (VXD) CALLS IN A DYNAMIC LINK LIBRARY (DLL)

BACKGROUND OF THE INVENTION

FIELD OF THE INVENTION

This invention relates to interfacing between an application program and a device driver in a computing system. More particularly, the invention relates to providing a flexible interface for data translation between an application program and a device driver.

CROSS-REFERENCE TO RELATED APPLICATIONS

The invention described in co-pending, commonly-assigned patent application Ser. No. 08/622,884 TRANSPARENTLY CONVERTING PROGRAM CALLS BETWEEN INTERFACES and filed concurrently herewith is herein incorporated by reference.

DESCRIPTION OF PRIOR ART

Many application level software programs are limited in their ability to transmit or receive data from external applications or devices. For example, as shown in FIG. 1, tool 12 used in the development of graphical user interfaces (GUI) 14 is designed to communicate with the GUI through standard Microsoft Windows[1] dynamic link libraries (DLL) 13. One such tool, the QA Partner[2] test tool by Segue Software, tests GUI applications by communicating with standard Windows GUI controls through standard Windows Application Program Interface DLL functions.

[1] Windows, Windows 3.1, Windows 3.11, Windows 3.X and Windows 95 are of trademarks of Microsoft Corporation.
[2] QA Partner is a trademark of Segue Software, Inc.

Among many of the operations that a GUI may perform, a GUI may invoke the device drivers of the operating system, such as Windows virtual device drivers (VxD). However, conventional test tools are not designed to communicate directly with a virtual device driver.

Since conventional test tools are used to test GUI's through conventional Windows DLLs, a virtual device driver level call, upon which the GUI is dependent, cannot be independently verified by the test tool. For instance, if the GUI performs operations which invoke and communicate with a device driver or VxD, there are no means for a conventional test tool to verify the proper underlying operation of the device driver.

Further, since conventional test tools are designed to test the operation of the GUI and are not designed to communicate with a device driver, these test tools do not support software testing of device drivers.

While the test tool permits communications with an external DLL, conventional test tools have limited communications capabilities when receiving or transmitting data with external programs. For instance, while test tools can communicate using message strings, conventional test tools cannot handle complex data structures involving pointers. For instance, the QA Partner test tool cannot pass pointers or dynamically allocate memory.

Additionally, conventional test tools do not support high level language structures, such as algorithms written in C or C++. Therefore, conventional test tools do not directly support Microsoft's interface of DeviceIOControl, used by high-level programs to communicate with a VxD.

SUMMARY OF THE INVENTION

In accordance with this invention, the above problems have been solved by creating an interface in a dynamic link library which communicates with and provides data translation functions from a calling program, such as a test tool, to a device driver.

In a method implementation of the invention, a virtual device driver in an operating system of a computing system is accessed from a calling program in order to verify the operation of the virtual device driver. The method begins by decoding, in a dynamic link library, a request from the calling program to perform an operation supported by the virtual device driver. An address of the virtual device driver to perform the requested operation is acquired in the dynamic link library. A module maintained in the dynamic link library for processing the requested operation is invoked, and data from this module is passed to the virtual device driver in response to the requested operation.

As a further feature of the invention, a setup step configures data parameters in the module of the dynamic link library for passing the request data from the calling program to the virtual device driver. A return value is received from the virtual device driver indicating the success or failure of the requested operation. A passing step passes the return value from the module of the dynamic link library to the calling program.

In another feature of the invention, the module of the dynamic link library receives data returned from the virtual device driver in response to the requested operation. This module of the dynamic link library processes the data returned from the virtual device driver and passes the data processed by the module to the calling program.

The above computer implemented steps in another implementation of the invention are provided as an article of manufacture, i.e., a computer storage medium containing a computer program of instructions for performing the above-described steps.

In a machine implementation of the invention, an apparatus for accessing a virtual device driver in an operating system in a computer from a calling program in order to perform and verify requested operations of the virtual device driver. The apparatus has a decoder, an acquisition module, an invoking module, and a call module. The decoder is in a dynamic link library and decodes a request from the calling program to perform an operation supported by the virtual device driver. The acquisition module acquires the address of the virtual device driver corresponding to the requested operation. The invoking module invokes a processing module in the dynamic link library to perform the requested operation. The call module passes data from the processing module of the dynamic link library to the virtual device driver in response to the requested operation.

In another feature of the invention a setup module configures data parameters, in the processing module of the dynamic link library, for passing by data from the calling program to the virtual device driver. A receiver receives, from the virtual device driver, a return value indicating the success or failure of the requested operation, and a return module passes the return value from the module of the dynamic link library to the calling program.

In another feature of the invention, a receiver in the processing module of the dynamic link library receives data returned from the virtual device driver in response to the requested operation. The processing module of the dynamic link library processes the data returned from the virtual device driver, and a data sending module passes the data processed by the processing module to the calling program.

The great advantage and utility of the present invention is that a calling program, such as a conventional test tool program, can be linked to a device driver through the data translating DLL of the present invention. In this manner, a calling program can communicate with the device driver and verify its operations.

Still another utility of the present invention is the translation data contained in complex data structures from the device driver to a conventional test tool.

Still another utility of the present invention is that it enables a test tool to independently read, write, and modify data of a device driver.

Still another utility of the present invention is to permit a software developer to use a conventional test tool in the development of a device driver.

The foregoing and other features, utilities, and advantages of the invention will be apparent from the following more particular description of a preferred embodiment of the invention as illustrated in the accompanying drawings.

DETAILED DESCRIPTION OF PREFERRED EMBODIMENTS

The embodiments of the invention described herein are implemented as logical operations in a computing system. The logical operations of the present invention are implemented (1) as a sequence of computing implemented steps running on the computing system and (2) as interconnected machine modules within the computing system. The implementation is a matter of choice dependent on the performance requirements of computing system implementing the invention. Accordingly, the logical operations making up the embodiments of the invention described herein are referred to variously as operations, steps, or modules.

The present invention imbeds modules in a DLL which are capable of communicating with device driver, such as a VxD, and a calling program, such as a test tool. The modules process requests from the test tool to formulate calls to the VxD, and process the data returned by the VxD. The modules include a command module, a write module, a read module, a read/post-process module, and a read/modify/write module.

Since a DLL is a module capable of being publicly shared by many application programs, the present invention provides calling programs such as a test tool with the ability to control and monitor the operation of a device driver.

Figure 1:
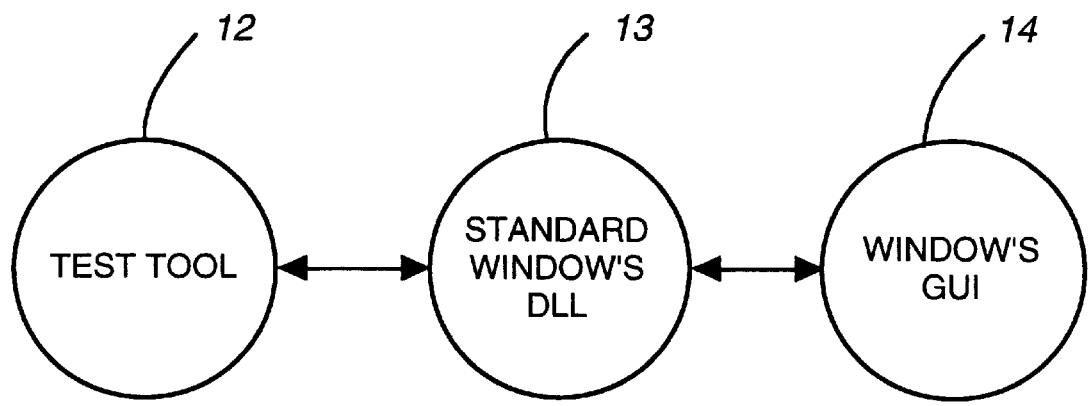
FIG. 1 illustrates conventional test tool communication interfaces.
Figure 2:
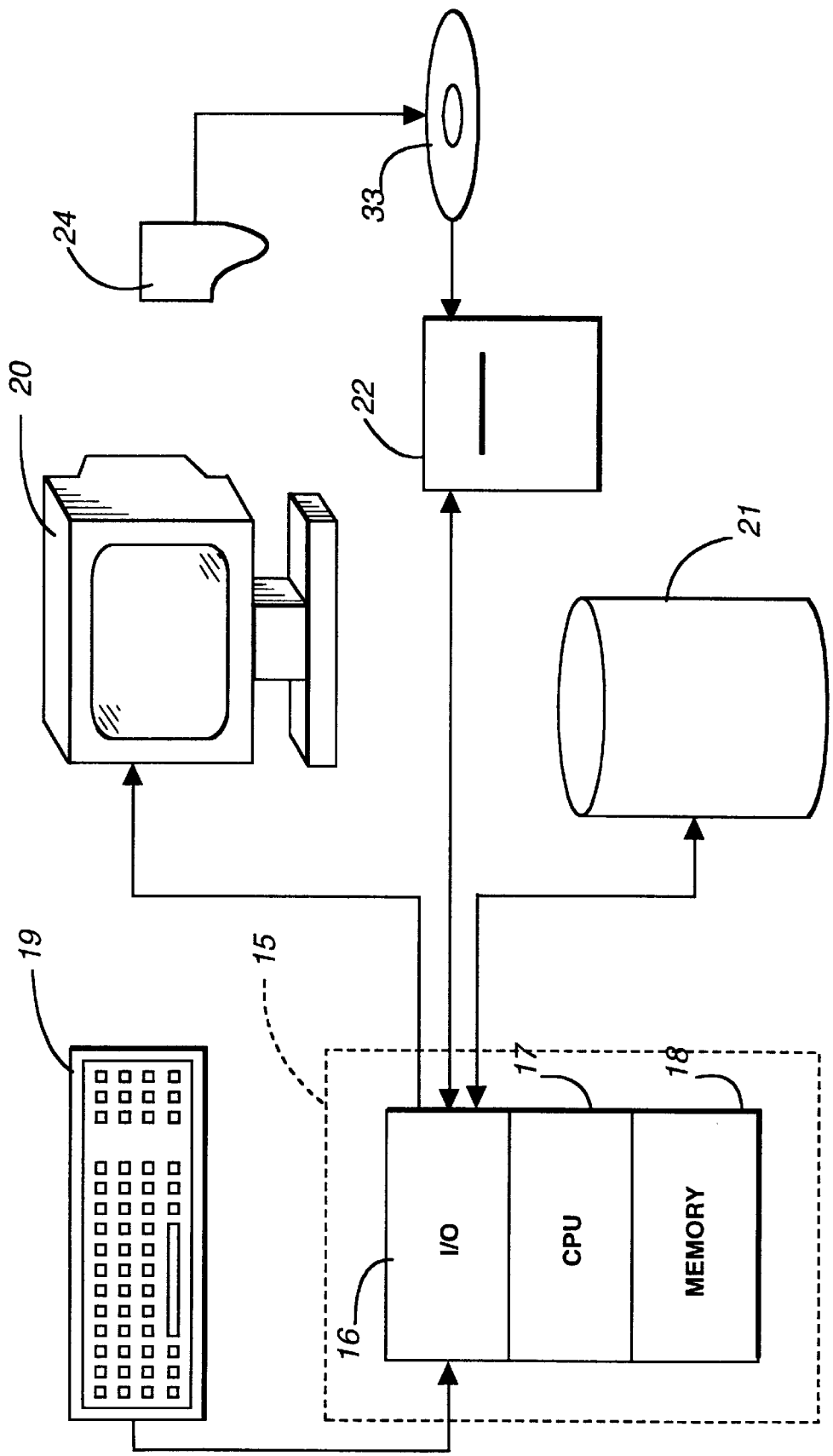
FIG. 2 illustrates a computing system to perform the computer implemented steps in accordance with the invention.

The operating environment in which the present invention is used encompasses standalone computing systems or a general distributed computing system, wherein general purpose computers, workstations, or personal computers are connected via communication links of various types, in a client-server arrangement, wherein programs and data, many in the form of objects, are made available by various members of the system. Some of the elements of a standalone computing system or a general purpose workstation computer are shown in FIG. 2, wherein a processor 15 is shown, having an input/output (I/O) section 16, a central processing unit (CPU) 17 and a memory section 18. The I/O section 16 is connected to a keyboard 19, a display unit 20, a disk storage unit 22 and a CD-ROM drive unit 22. The CD-ROM unit 22 can read a CD-ROM medium 23 which typically contains programs 24 and data. The computer program products containing mechanisms to effectuate the apparatus and methods of the present invention may reside in the memory section 18, or on a disk storage unit 21, or on the CD-ROM 23 of such a system. Examples of such systems include SPARC systems offered by Sun MicroSystems, Inc., personal computers offered by IBM Corporation and by other manufacturers of IBM-compatible personal computers, and systems running the UNIX operating system or Solaris™ operating system.

Figure 3A:
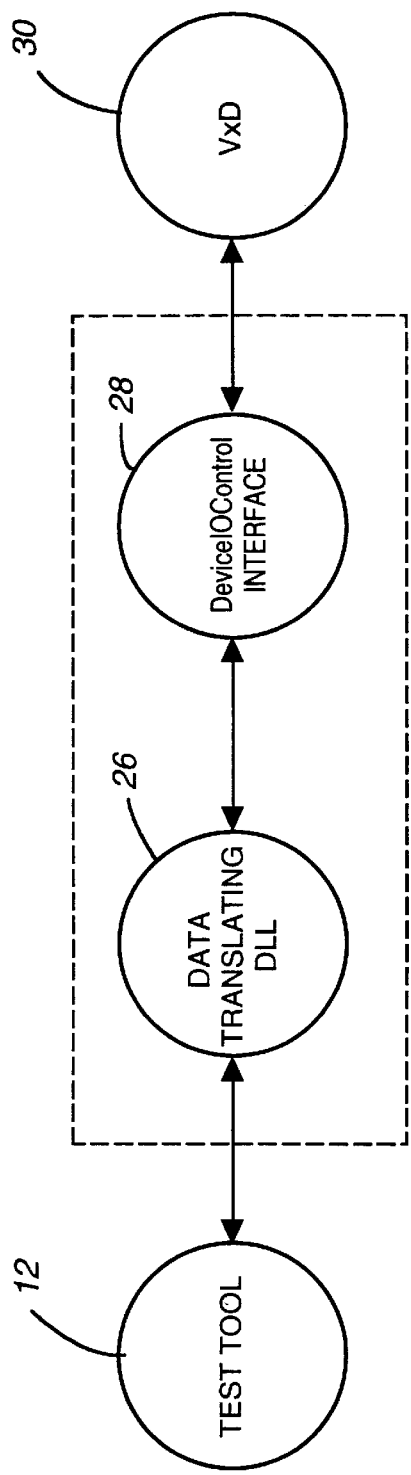
FIG. 3A is a preferred embodiment of the interface according to the present invention.
Figure 3B:
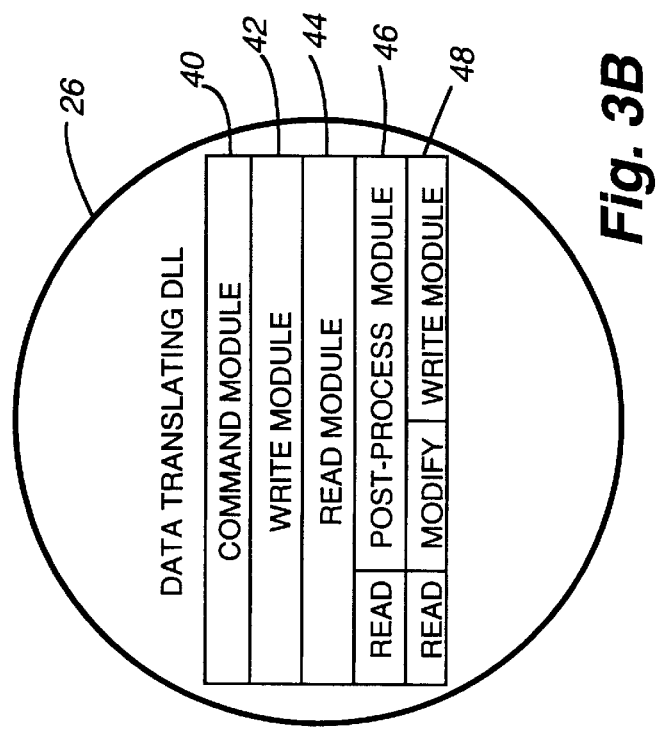
FIG. 3B is a preferred embodiment of the interface according to the present invention.

FIG. 3A shows a block diagram a preferred embodiment of the present invention. Data translating DLL 26 provides a communication interface between calling program 12, such as a test tool, and VxD 30. As can be seen from FIG. 3A, a bi-directional connection operates to connection DLL 26 to DeviceIOControl interface 28. Data translating DLL 26 communicates with VxD 30 through calls to the interface of DeviceIOControl 28. Interface 28 provides a generic link between external programs and device drivers of the operating system, such as VxD 30. However, as previously explained, conventional versions of test tool 12 cannot support communications to and from DeviceIOControl interface 28. Therefore, the data translation DLL has a command module 40, write module 42, read module 44, read/post-process module 46, and read/modify/write module 48, as shown in FIG. 3B. The operation of each of these modules is described below in greater detail.

Figure 4:
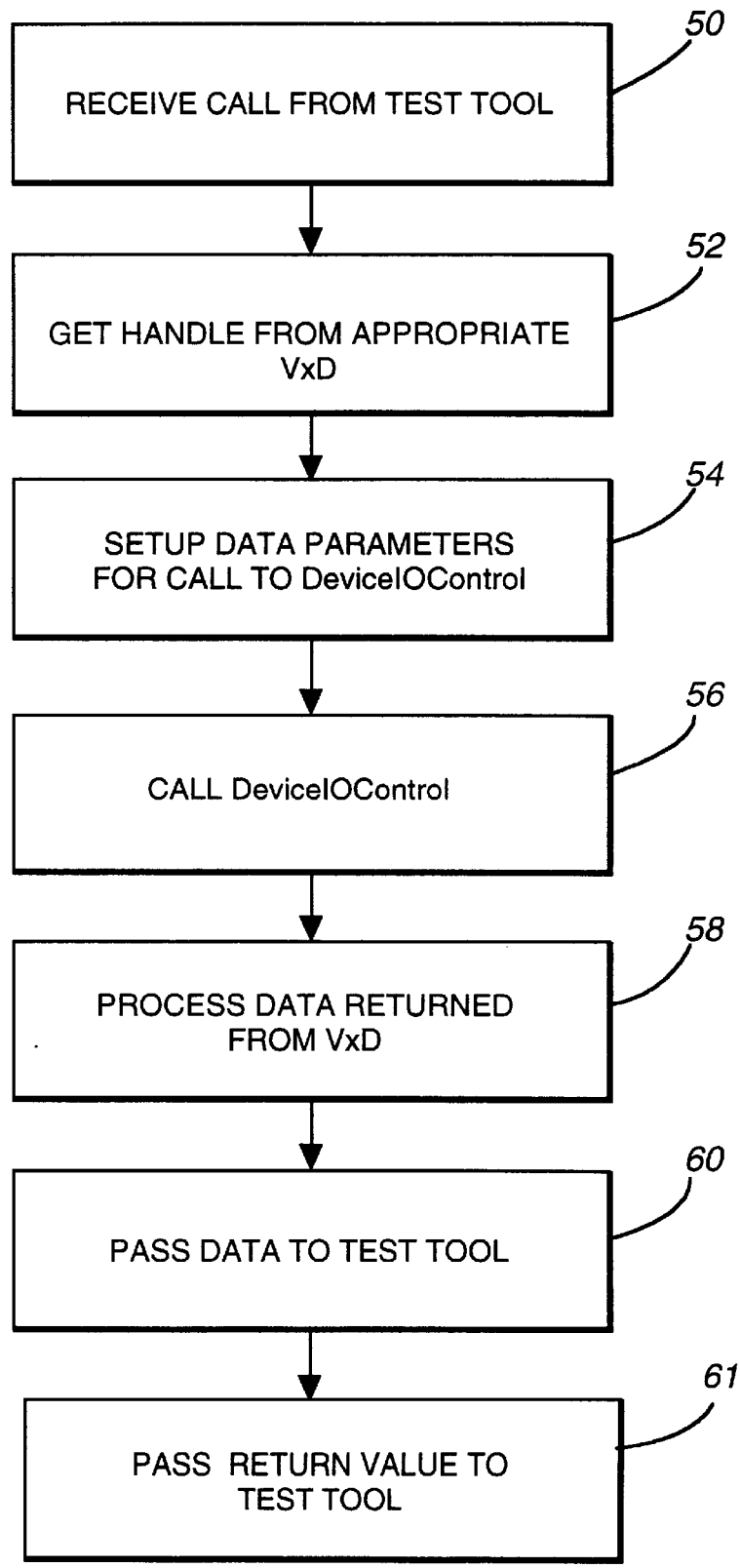
FIG. 4 shows the logical operations performed by the interface of FIG. 3A.

The overall operation of the preferred embodiment is shown in FIG. 4. At operation 50, data translating DLL 26 receives the call from the external calling program or test tool 12. The call from test tool 12 typically involves a function name and data parameters as arguments of the function. The functions and data parameters required by DLL 26 would be known, a priori, to the software developer using test tool 12. A number of functions can be incorporated into the DLL 26 of the present invention. These functions could include operations to access or control the VxD. For example, DLL 26 could support functions to create a cache, delete the cache, get the VxD version, get cache information, get drive statistics, etc. These higher level functions supported by DLL 26 of the present invention would utilize the respective modules 40–48 shown in FIG. 3B. For instance, a function to delete the cache would access command module 40 so that the test tool could instruct the VxD to delete the cache maintained by the device driver.

When the test tool seeks to pass data to the VxD, the data translating DLL 26 extracts this data at operation 50 in FIG. 4 from the call made by the test tool. Based on the data passed by the test tool to the DLL 26, operation 52 requests the "handle" from the appropriate VxD. The "handle" is the addressed identifier of the device driver to be accessed, and the handle is maintained by the operating system. Therefore, before the DLL 26 can communicate with a particular VxD, the DLL must first obtain the address of the VxD as maintained by the operating system.

Setup operation 54 at DLL 26 configures, establishes or translates any data parameters necessary to access VxD 30 through the DeviceIOControl interface 28.

The DeviceIOControl interface 28 is described in the above cross-referenced related application. Using the translating interface disclosed in the above cross-referenced related application, the present invention can be used in either a Windows 95 or Windows 3.X environment.

The arguments to the DeviceIOControl interface 28 include a "handle" (described above), function number, input data pointer, size of input buffer, output data pointer, size of output buffer, pointer to a variable for receiving the output byte count, and a pointer for overlap input or output. The function number governs the operation to be performed by the given device driver, while the various pointers are used to pass data to and from interface 28 and the VxD 30.

Having received the desired function to be performed by the test tool and appropriately building the parameters used by DeviceIOControl interface 28, DLL 26 calls DeviceIO-Control at call operation 56 with the appropriate parameters. DeviceIOControl 28 then communicates with VxD 30, as shown in FIG. 3A, so that the VxD performs the requested function. VxD 30 then returns data to DeviceIOControl interface 28 depending on the requested function.

Operation 58 in FIG. 4 processes the data returned to the data translating DLL 26 from the VxD, and data send module 60 passes this data up to the test tool. Return module 61 passes a return value to the test tool indicating the success or failure of the requested operation. In this manner, a developer using test tool 12 can control and observe the operations of VxD 30.

Figure 5:
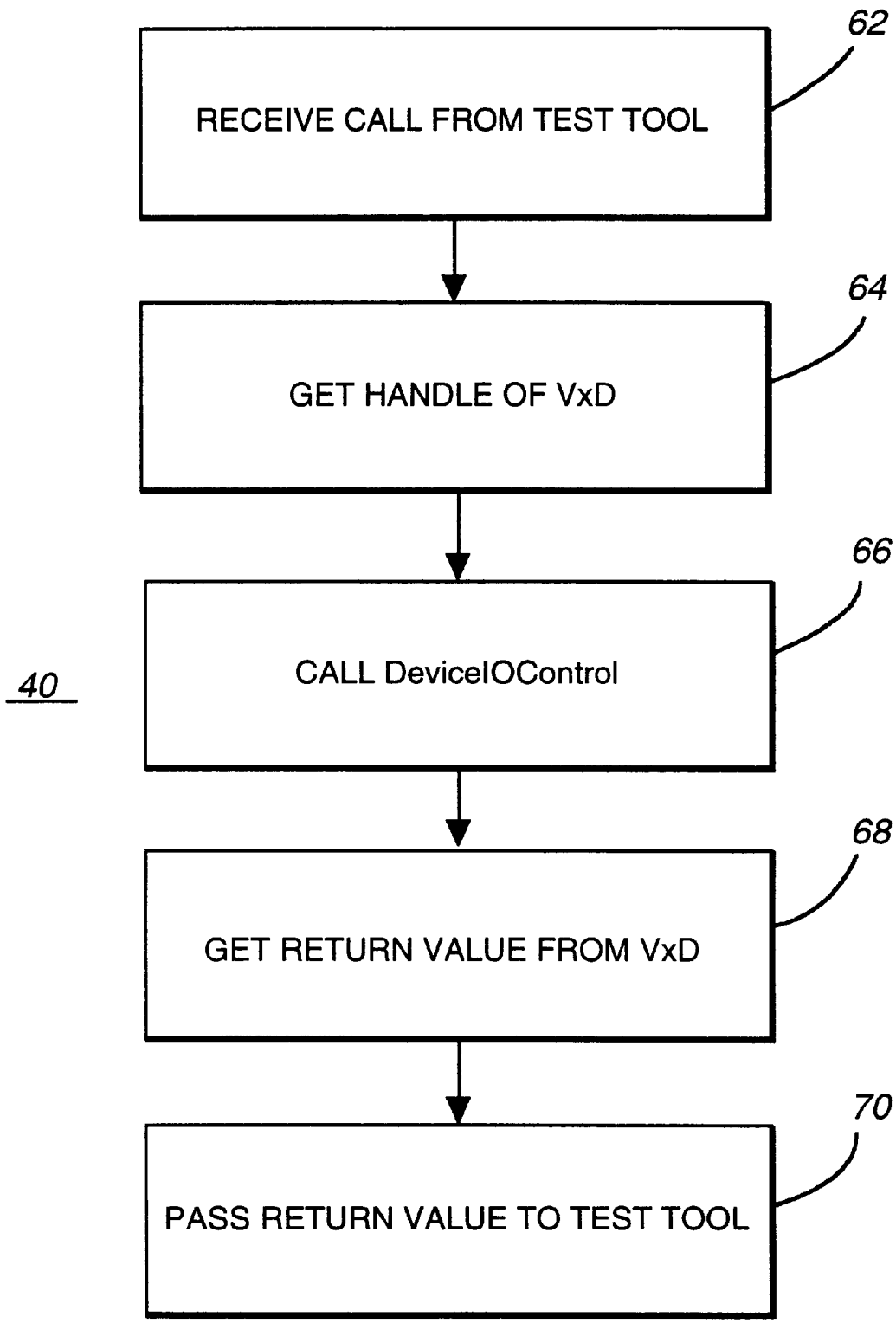
FIG. 5 shows the logical operations performed by a command operation of the interface.

FIG. 5 shows the logical operations of the command module 40 of FIG. 3B. As previously described, command module 40 is resident in data translating DLL 26 of the present invention. The command module 40 permits test tool 12 to issue commands to the VxD 30. For example, these commands could include a delete cache, flush cache, or reset statistics command. As shown in FIG. 5, operation 62 of command module 40 receives the calling function and arguments from the test tool. Operation 64 gets the handle of the appropriate VxD to perform the desired function to be controlled by the test tool. Then step 66 calls DeviceIO-Control using the handle and the appropriate function number derived from the desired function requested by the test tool. No further data pointers are required in formulating the calls of module 40 to DeviceIOControl. The VxD would then perform the requested function. Upon completing the requested function, the VxD would provide a return value to the calling routine. This return value could indicate, among other things, the success or failure of the requested operation.

At operation 68, command module 40 receives the return value from the VxD and passes this return value to the test tool at operation 70. In this manner, test tool 12 has issued a given command to the VxD through the DLL interface 26 of the present invention, and the test tool is provided with information regarding the success or failure of the requested command.

Figure 6:
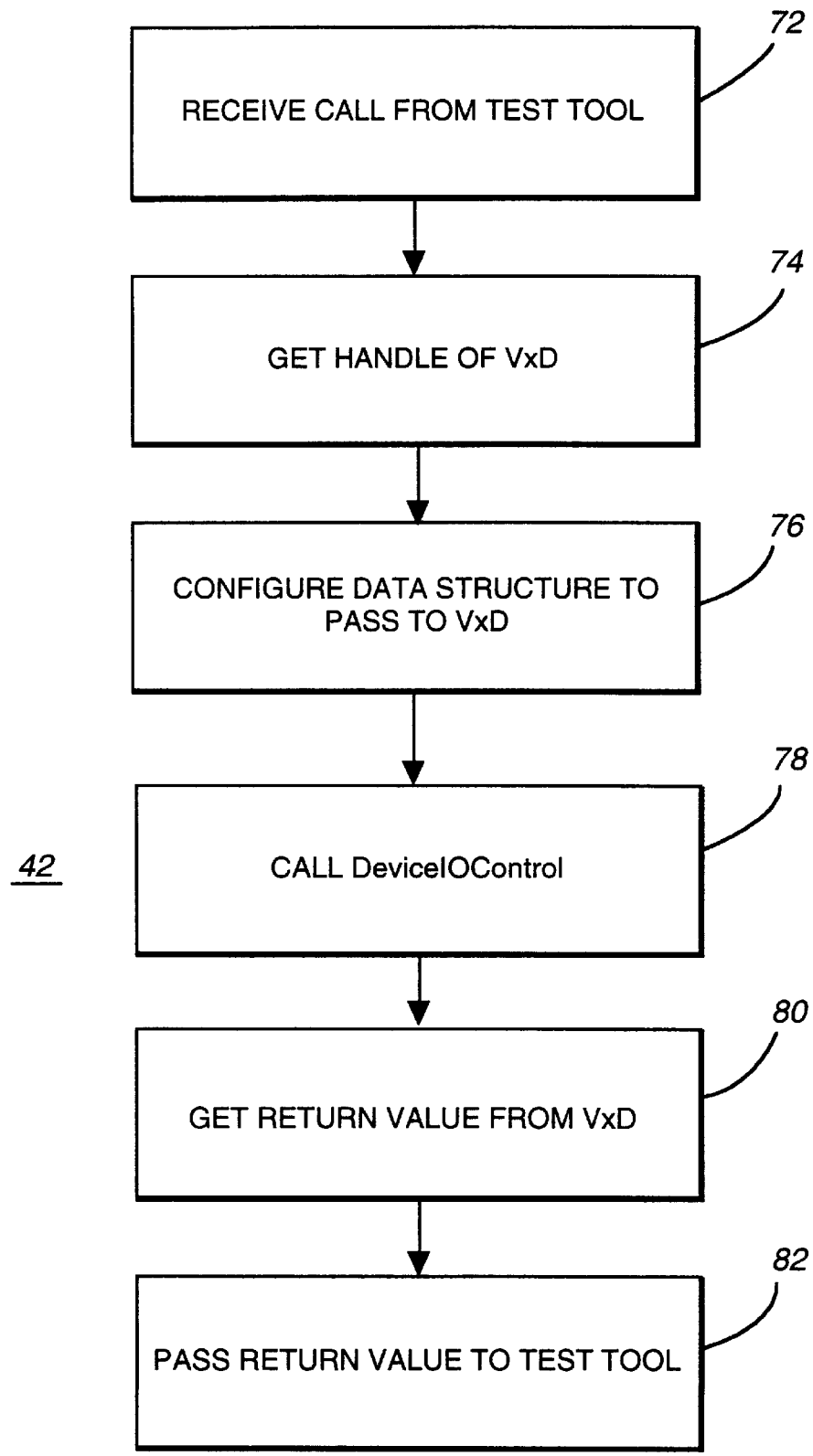
FIG. 6 shows the logical operations performed by a write operation of the interface.

FIG. 6 illustrates the logical operations of the write module 42 of FIG. 3B. Write module 42 provides test tool 12 with the ability to transmit data to a particular device driver or VxD 30.

The write module 42 at operation 72 receives the call and parameters from the test tool. Operation 74 obtains the handle of the appropriate VxD to be affected by the requested operation. Based on information received from the test tool call, operation 76 configures data structures to be passed to the VxD through DeviceIOControl interface 28. In particular, write module 42 establishes pointers to memory locations which contain the data provided by the test tool. Operation 78 passes these pointers to the VxD, and the VxD reads the values contained in these memory locations and acts appropriately based thereon. The VxD then generates a return value passed through DeviceIOControl interface 28. Operation 80 receives the return value from the VxD, and operation 82 passes this value up to the test tool.

In this manner, write module 42 enables a developer using test tool 12 to write data into the VxD. For instance, a create cache function could include information sent from the test tool to the VxD relating to the drive to be used as a cache and the size of the cache. The write module 42 is used to pass this data from the test tool 12 to the VxD 30.

Figure 7:
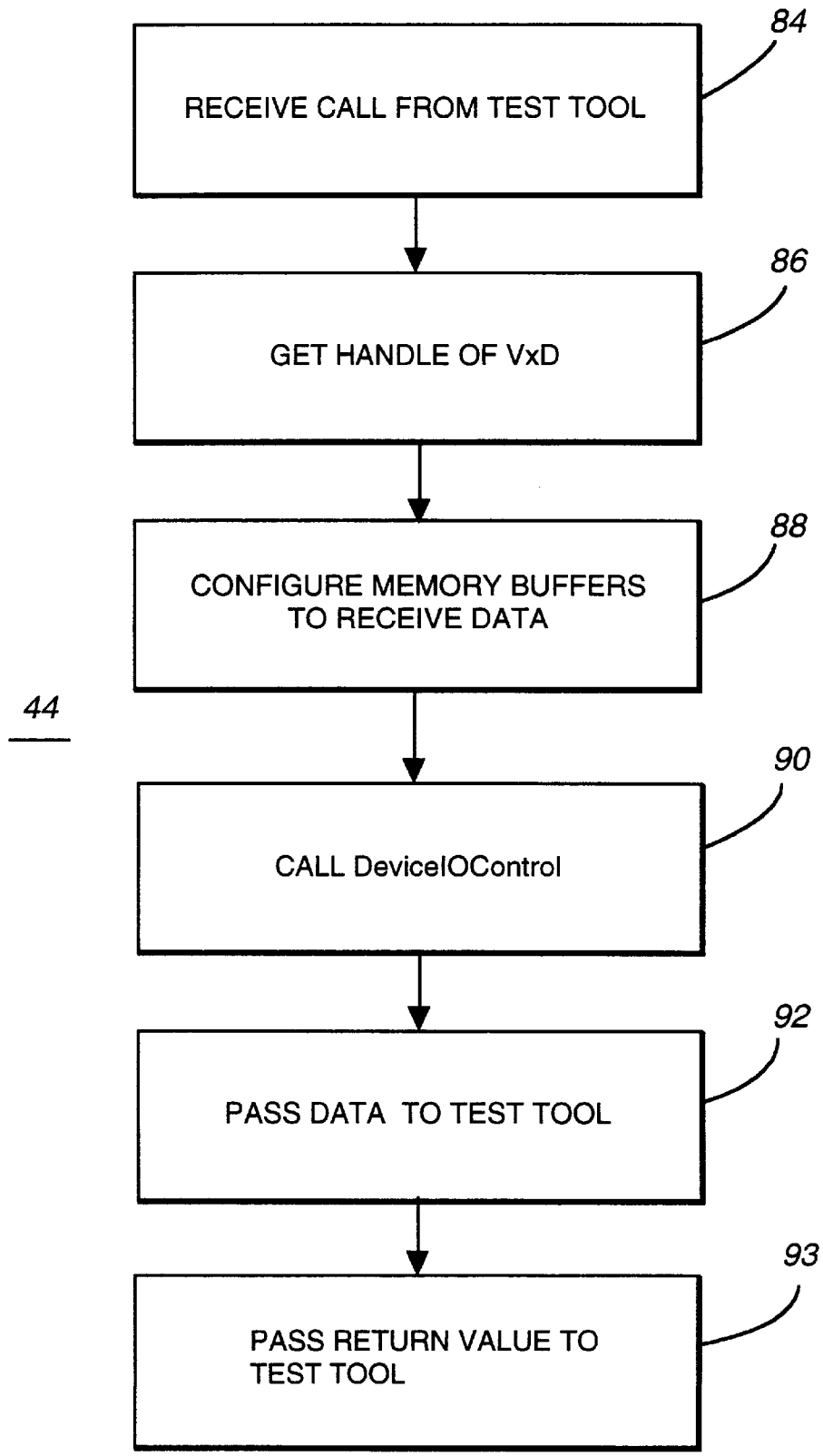
FIG. 7 shows the logical operations performed by the read operation of the interface.

The logical operations of read module 44 are illustrated in FIG. 7. Read module 44 enables the calling program or test tool 12 to retrieve data from the VxD. For instance, functions could be implemented to provide information about the state of a disk cache, or the version number of a particular device driver.

Operation 84 of read module 44 receives the call from the test tool, and operation 86 retrieves the handle of the appropriate VxD. Then operation 88 configures memory buffers to receive data from the VxD. In making the call to the data translating DLL 26, test tool 12 can provide a pointer to a memory location where the information from the VxD should be placed. This pointer is used by operation 92 of read module 44 to pass the requested data up to the test tool after operation 90 has invoked DeviceIOControl. At operation 92, the read module passes this data to the test tool as well as passing the return value, at operation 93, indicating the success or failure of the operation.

Read module 44 permits test tool 12 to access data maintained in simple structures (i.e., single integer values). For more complicated data structures (i.e., arrays of data), read/post-processing module 46 of the present invention must be utilized.

Figure 8:
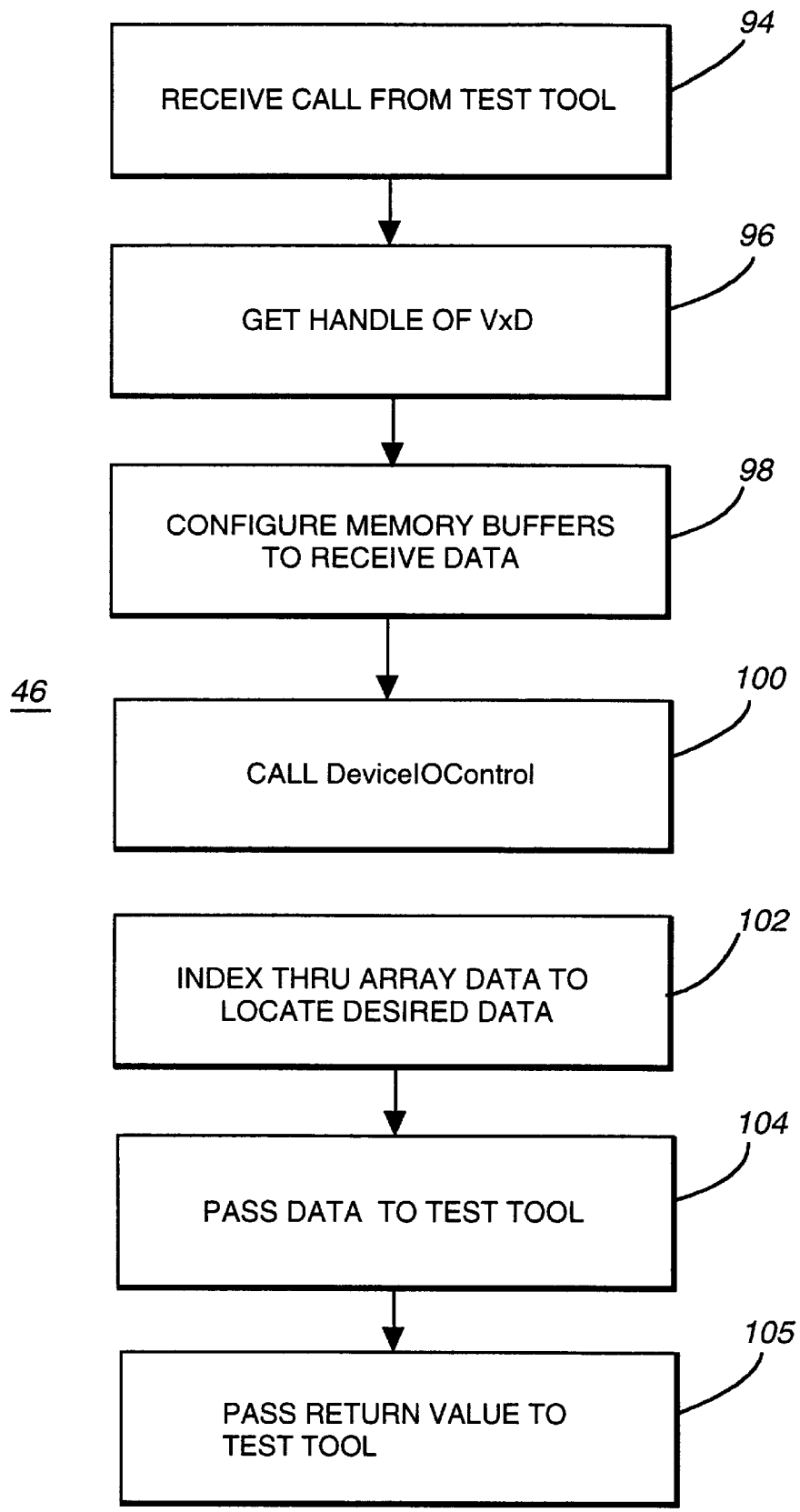
FIG. 8 shows the logical operations performed by the read/post-processing operations of the interface.

FIG. 8 illustrates logical operations of read/post-processing module 46 of FIG. 3B. Depending upon the implementation of a particular VxD device driver, some VxDs will respond to a request for information by providing an entire arrayed data structure. For instance, one VxD function may provide an array of information about the hits and misses of all of the drives in the computing system. A developer using a conventional test tool, however, would need information relating solely to one of the drives of the system. Hence, read/post-processing module 46 is designed to receive all of the data provided by the VxD and report only the requested data to the test tool.

Operation 94 of the read/post-processing module 46 receives the call from the test tool requesting information from a particular VxD device driver. Step 96 retrieves the handle of the appropriate VxD. Then operation 98 configures a memory location for storage of the array of information to be obtained from the VxD. Operation 100 of the read/post-processing module 46 calls the VxD through DeviceIOControl interface 28 and instructs the VxD to place the array of information at the specified memory location. In response to this message, the VxD fills the specified memory location with the array of data.

Operation 102, read/post-processing module 46 indexes through the array of data to locate the desired information requested by the test tool. After locating this information, operation 104 then passes this data to the test tool. Operation 105 passes the success/failure return value to the test tool.

In this manner, module 46 breaks down a complex data structure and passes only the needed elements of the data structure to the external calling program or test tool 12. While the initial operations of module 46 are similar to the operations of read module 44, because of the complexity of the array of data generated by the VxD, the post-processing operation 102 is needed prior to passing data back to the test tool.

Figure 9:
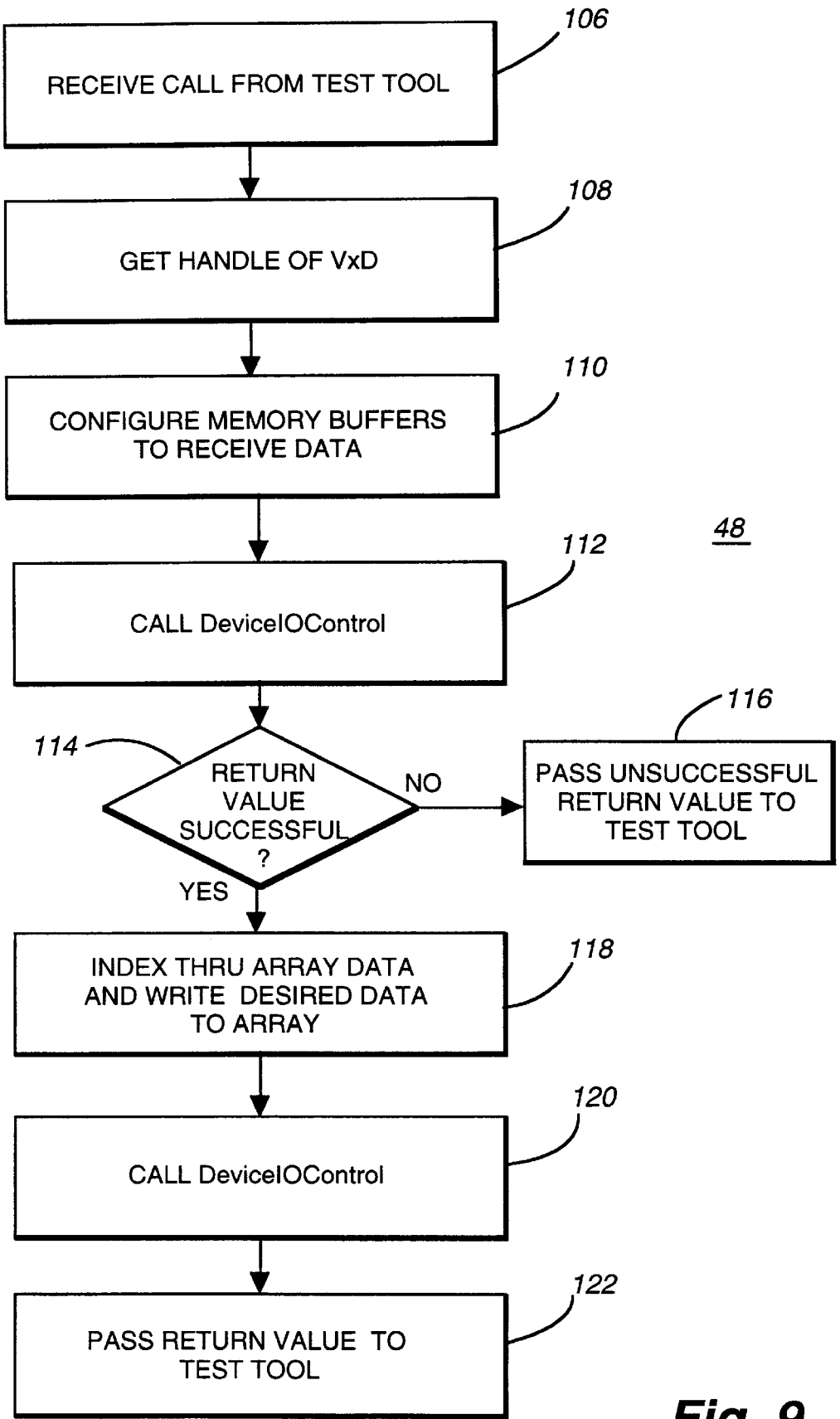
FIG. 9 shows the logical operations performed by the read/modify/write operations of the interface.

FIG. 9 illustrates the operations of read/modify/write module 48 of FIG. 3B incorporated into data translating DLL 26. Module 48 permits the external calling program or test tool 12 to change the parameters maintained by the VxD in a large data structure. For example, if a VxD maintains a large table containing alterable parameters of the drives in a computing system, then the VxD may require that the entire table be written in order to modify a single parameter. Such a VxD requirement would imply that a calling program seeking to write or change a single element of the array must first read the entire array, alter the desired element of the array, and then write the entire array to the VxD. Module 48 of the present invention can be used in this capacity.

At operation 106 of FIG. 9, module 48 receives the call from the test tool. Operation 108 fetches the handle of the appropriate VxD to be operated upon. Then operation 110 configures the address of the memory to store information to be retrieved from the VxD, in a manner similar to operation 98 of FIG. 8. Operation 112 calls DeviceIOControl to pass to the VxD the location wherein the array of data should be placed. Decision operation 114 tests the return value from the VxD for successful operation and reports an unsuccessful result at operation 116 if module 48 was unable to read the array from the VxD.

If, however, operation 112 was successful, then operation 118 indexes through the received array of data to the location of the desired element. Operation 118 overwrites the value contained in this memory location of the array. Step 120 calls DeviceIOControl to write the contents of the entire array back into the VxD. At operation 122, module 48 passes the return value up to the test tool indicating the success or failure of the write operation 120.

Hence, data translating DLL 26, comprised of modules 40–48, enables an external calling program, such as a test tool, to communicate with a VxD device driver of the operating system.

Figure 10:
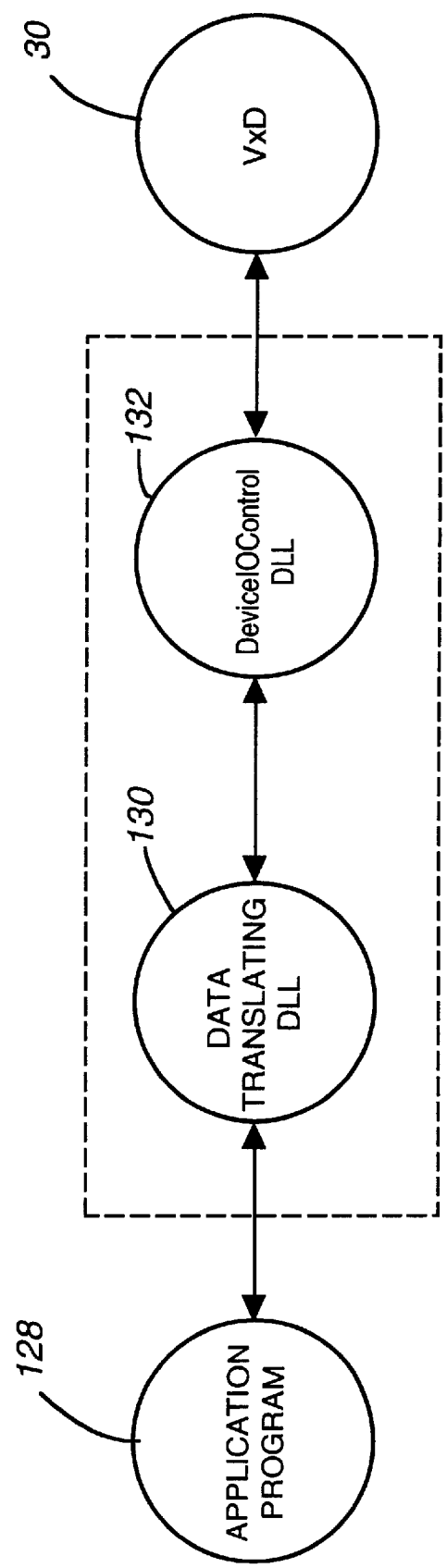
FIG. 10 shows an alternative embodiment of the present invention where two dynamic link libraries are used.

FIG. 10 illustrates an alternative embodiment of the present invention, wherein two separate DLLs are created which perform the operations described herein. The first data translating DLL 130 contains modules to manipulate data structures so that application program 20 and VxD 30 transmit compatible information. DeviceIOControl DLL 132 contains all of the appropriate calls described above to DeviceIOControl interface 28 (not shown). By separating the functions contained in modules 130 and 132 and placing them in DLLS, these modules become publicly accessible and sharable by application software used in the computing system. As can be seen from FIG. 10, a bi-directional connection operates to connect DLL 130 to DeviceIOControl interface 132.

Although a preferred embodiment of the present invention has been described in the environment of Windows 95, it will be apparent to one skilled in the art that the invention will be applicable to other environments such as Windows 3.1, Windows 3.11, or Windows NT.

While the invention has been particularly shown and described with reference to preferred embodiments thereof, it will be understood by those skilled in the art that various other changes in the form and details may be made therein without departing from the spirit and scope of the invention.

What is claimed is:

1. Apparatus for accessing a virtual device driver in an operating system in a computer from a test tool calling program to perform and verify the performance of requested operations of the virtual device driver, wherein the test tool calling program does not support communication to and from a DeviceIOControl interface that provides an interface to the virtual device driver, the apparatus comprising:

a dynamic link library providing an interface to the calling program;

a DeviceIOControl interface providing an interface to the virtual device driver;

a connection connecting the dynamic link library to the DeviceIOControl interface;

a decoder module in the dynamic link library for decoding a request received from the calling program to perform a requested operation accessing the virtual device driver, the request having request data identifying the requested operation;

an acquisition module in the dynamic link library for acquiring an address of the virtual device driver from the operating system;

a setup module in the dynamic link library for configuring data parameters in accordance with the request, the data parameters enabling the dynamic link library to access the virtual device driver through the DeviceIOControl interface;

a calling module in the dynamic link library for calling the DeviceIOControl interface and for passing the data parameters, the acquired address, and the request data to the DeviceIOControl interface to enable the DeviceIOControl interface to request the virtual device driver to perform the requested operation;

a receiver in the DeviceIOControl interface for receiving from the virtual device driver a return value after the virtual device driver has performed the requested operation, the return value indicating the success or failure of the requested operation; and a return module in the dynamic link library for receiving the return value from the DeviceIOControl interface and for passing the return value to the calling program.

2. The apparatus of claim 1, further comprising:

a receiver in the DeviceIOControl interface for receiving return data from the virtual device driver in response to performance of the requested operation, and for passing the return data to the dynamic link library;

a data processing module in the dynamic link library for processing the return data; and a data sending module in the dynamic link library for sending the processed return data to the calling program.

3. A method for accessing a VxD in an operating system of a computing system from a test tool calling program to verify the operation of the VxD in performing a requested operation that is supported by the VxD, wherein the VxD is connected to a DeviceIOControl interface, and wherein the calling program is unable to support communications to and from the DeviceIOControl interface, the method comprising the computer-implemented steps of:

providing a dynamic link library (DLL) connected to the calling program;

providing a DeviceIOControl interface connected intermediate the DLL and the VxD;

decoding in the DLL a request from the calling program for the VxD to perform the requested operation, the request having request data identifying the requested operation;

acquiring in the DLL an address of the VxD from the operating system;

invoking a module in the DLL for processing the request;

configuring data parameters in the module in response to the request, the data parameters enabling the DLL to access the VxD through the DeviceIOControl interface;

passing from the module the acquired address, the request data, and the data parameters to the DeviceIOControl interface and then to the VxD;

performing the requested operation by the VxD;

sending a return value from the VxD to the DeviceIOControl interface to indicate the success or failure of the requested operation performed by the VxD;

receiving at the module the return value from the DeviceIOControl interface; and passing the return value from the module to the calling program.

4. The method of claim 2, further comprising the steps of:

receiving in the DeviceIOControl interface return data from the VxD responsive to completion of the requested operation;

transmitting the return data to the module;

processing the return data in the module; and passing the processed return data to the calling program.

5. The method of claim 3 wherein the module is a COMMAND module for sending commands from the calling program to the VxD.

6. The method of claim 5 wherein the module is a WRITE module for writing data from the calling program to the VxD.

7. The method of claim 3 wherein the module is a READ module for reading the return data, the method further comprising the steps of:

configuring memory buffers in the DDL for storing the processed return data; and passing the return data from the memory buffers to the calling program.

8. The method of claim 3 wherein the module is a READ/POST PROCESSING module for reading and then processing an array of return data returned by the VxD, the method of claim 3, further comprising the steps of:

configuring memory buffers in the DDL for storing the array of return data;

processing the stored array of return data, the processing including indexing through the array of return data to locate a data element responsive to the request by the calling program; and passing the located data element to the calling program.

9. The method of claim 3 wherein the module a READ/MODIFY/WRITE module for reading a data structure returned from the VxD, modifying an element of the returned data structure, and writing the modified data structure to the VxD, the method further comprising the steps of:

configuring memory buffers in the DDL for storing the returned data structure;

receiving in the READ/MODIFY/WRITE module the data structure returned from the VxD;

storing the data structure in the memory buffers;

receiving in the READ/MODIFY/WRITE module a return value indicating the success or failure of the requested operation;

if the return value indicates that the requested operation was successful, processing in the READ/MODIFY/WRITE module the stored data structure, the processing including indexing through the stored data structure to locate a data element to be modified responsive to the request by the calling program;

modifying the located data element;

forming a modified data structure that includes the modified data element; and writing the modified data structure to the VxD.

10. A computer program storage medium readable by a computing system and encoding a computer program of instructions for executing a computer process for accessing a virtual device driver from a test tool calling program in order to verify operation of the virtual device driver in performing a requested operation that is supported by the virtual device driver, wherein the virtual device driver is connected to a DeviceIOControl interface, and wherein the calling program does not support communications to and from the DeviceIOControl interface, the computer process comprising the steps of:

providing a dynamic link library that interfaces with the calling program;

providing a DeviceIOControl that interfaces with the dynamic link library and with the virtual device driver;

decoding in the dynamic link library a request from the calling program to perform the requested operation, the request being a request to use the virtual device driver and having request data identifying the requested operation;

acquiring in the dynamic link library and from the computing system, an address of a virtual device driver corresponding to the requested operation;

invoking a module maintained in the dynamic link library for processing the requested operation;

configuring data parameters in the module, the data parameters being necessary for the dynamic link library to access the virtual device driver through the DeviceIOControl;

using the data parameters to pass data from the module to the DeviceIOControl and then to the virtual device driver responsive to the requested operation;

performing the requested operation at the virtual device driver;

passing a return value from the virtual device driver to the DeviceIOControl to indicate the success or failure of the requested operation;

passing the return value from the DeviceIOControl to the module; and passing the return value from the module to the calling program.

11. The computer process of claim 10 further comprising the steps of:

receiving in the DeviceIOControl library data that is returned from the virtual device driver responsive to the requested operation;

passing the library data from the DeviceIOControl to the module;

processing the library data in the module; and passing the processed library data from the module to the calling program.

* * * * *

UNITED STATES PATENT AND TRADEMARK OFFICE
CERTIFICATE OF CORRECTION

PATENT NO : 6,041,363
DATED : March 21, 2000
INVENTOR(S) : Shaeffer

It is certified that error appears in the above-identified patent and that said Letters Patent is hereby corrected as shown below:

On the title page, item [56]

In the Other Publications section please add: IBM Technical Disclosure Bulletin, Vol. 38, no. 10, October 1995, New York, U.S. pp 263-68 Anonymous: "Device Driver Test Tool".

In Column 4, line 11, delete "22" and insert --21-- in its place.

In Column 4, line 25, delete "as can be seen from FIG. 3A, a bi-directional connection operates to connection DLL 26 to DeviceIOControl interface 28" and insert -- as can be seen from FIG. 3A, an un-numbered bi-directional connection operates to connect DLL 26 to DeviceIOControl interface 28-- in its place.

Column 7, line 39, delete "20" and insert --128-- in its place.

Column 7, line 46, after "FIG. 10" delete "a" and insert --an un-numbered-- in its place.

Column 9, line 20, delete "5" and insert --3-- in its place.

Signed and Sealed this

Twenty-seventh Day of March, 2001

Attest:

NICHOLAS P. GODICI

Attesting Officer

*Acting Director of the United States Patent and Trademark Office*